United States Patent
Freller et al.

[15] 3,665,366
[45] May 23, 1972

[54] HALL PROBE FOR MEASURING AN AXIAL MAGNETIC FIELD IN A BORE

[72] Inventors: Helmut Freller; Magdalena Obitz, both of Nuremberg, Germany

[73] Assignee: Siemens Aktiengesellschaft, Berlin, Germany

[22] Filed: July 1, 1969

[21] Appl. No.: 838,233

[30] Foreign Application Priority Data

July 12, 1968 Germany......................P 17 66 756.6

[52] U.S. Cl..............................................338/32 H, 324/45
[51] Int. Cl.............................................................H01c 7/16
[58] Field of Search.....................338/32; 307/309; 317/235; 324/45, 46

[56] References Cited

UNITED STATES PATENTS 2,707,769  5/1955  Shaper......................................324/45
3,359,495  12/1967  McMaster et al........................324/45

FOREIGN PATENTS OR APPLICATIONS 785,251  10/1957  Great Britain............................324/45

OTHER PUBLICATIONS

Bell Inc., High Sensitivity Gaussmeter, Model 120, Form No. HSG566

Primary Examiner—Rodney D. Bennett, Jr.
Assistant Examiner—R. Kinberg
Attorney—Curt M. Avery, Arthur E. Wilfond, Herbert L. Lerner and Daniel J. Tick

[57] ABSTRACT

Four molybdenum wires are embedded in a hardened glass rod having a small diameter and resistant to extreme temperature changes. Each of the wires has an end at an axial end surface of the rod coplanar with such surface. A layer of semiconductor material of specific configuration on the end surface of the rod covers the wire ends and has a temperature coefficient of the Hall voltage and the electrical specific resistance which is less than or equal to 0.1 percent per degree Centigrade.

8 Claims, 3 Drawing Figures

Patented May 23, 1972

3,665,366

HALL PROBE FOR MEASURING AN AXIAL MAGNETIC FIELD IN A BORE

DESCRIPTION OF THE INVENTION

The present invention relates to a Hall probe. More particularly, the invention relates to a Hall probe for measuring an axial magnetic field in a bore. The Hall probe of the present invention has a small diameter and is resistant to extreme temperature variations.

A "small diameter" is intended to be a diameter equal to or less than 2 mm. The Hall probe of the present invention is resistant to extreme temperature changes, and therefore no irreversible changes in the characteristics of said Hall probe will occur within a temperature range of −273° to +200° C.

In cryogenics, particularly during the investigation of superconductor effects, it is often necessary to measure magnetic fields inside small bores at low temperatures. Hall generators or devices provide good results in measuring magnetic fields at normal temperatures and special designs of Hall generators are accurate in measuring magnetic fields at high and low temperatures. When Hall generators having vapor-deposited semiconductor layers are utilized, however, bores having diameters of less than 2 mm create considerable difficulties in permitting the positioning or placement of the four terminal contacts of the Hall device on the active semiconductor layer. These difficulties are considerably increased by the requirement that the Hall device have a satisfactory resistance to temperature variations of its contacts within a temperature range of −273° to +200° C. It has thus been impossible to produce Hall probes having satisfactory characteristics, including diameters of less than or equal to 2 mm for utilization in a temperature range of −273° to +200° C.

The principal object of the present invention is to provide a new and improved Hall probe for measuring an axial magnetic field in a bore.

An object of the present invention is to provide a Hall probe for measuring an axial magnetic field in a bore, which probe overcomes the disadvantages of known probes of similar type.

An object of the present invention is to provide a Hall probe for measuring an axial magnetic field in a bore with accuracy, efficiency and reliability.

An object of the present invention is to provide a Hall probe for measuring an axial magnetic field in a bore, which probe is resistant to temperature changes within a temperature range of −273° to +200° C.

An object of the present invention is to provide a Hall probe for measuring an axial magnetic field in a bore, which probe has a diameter less than or equal to 2 mm.

An object of the present invention is to provide a Hall probe for measuring an axial magnetic field in a bore, which probe is of simple, but effective, structure and is produced and operated with facility.

In accordance with the present invention, a Hall probe for measuring an axial magnetic filed in a bore comprises a small rod of electrically insulating material having a small diameter and resistant to extreme temperature changes. The rod has an axial end surface. Four wires are embedded in the rod. Each wire has an end at the end surface of the rod. The wire ends and the end surfaces are coplanar. A layer of semiconductor material of specific configuration is provided on the end surface of the rod and covers the wire ends. The wire ends are in electrical contact with the layer of semiconductor material. The semiconductor material has a temperature coefficient of the Hall voltage and the electrical specific resistance which is less than or equal to 0.1 percent per degree Centigrade.

The rod comprises hardened glass. Each of the wires comprises molybdenum. Each of the wires has a diameter in the range of 0.05 to 1.0 mm. The wire ends are at the points of a square on the end surface of the rod.

The layer of semiconductor material has a thickness of 0.5 to 3.0 micrometers and comprises indium arsenide.

In order that the present invention may be readily carried into effect, it will now be described with reference to the accompanying drawing, wherein:

FIG. 1b is a sectional view taken along the lines 1b—1b if FIG. 1a; and

FIG. 2 is an end view taken along the lines II—II of FIG. 1a.

Figure 1A:
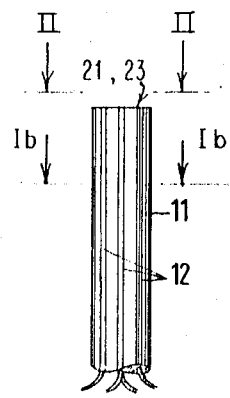
FIG. 1a is a view of an embodiment of a Hall probe of the present invention for measuring an axial magnetic field in a bore.
Figure 1B:

In FIGS. 1a and 1b, four molybdenum wires 12, spaced from each other at the four corners or points of a square, are embedded in a small rod 11 of hardened glass. Each of the wires 12 has a diameter of 0.05 to 0.1 mm. The corresponding wire end of each of the molybdenum wires 12 is positioned at, and coplanarly with, an end surface 21 of the rod 11.

Figure 2:
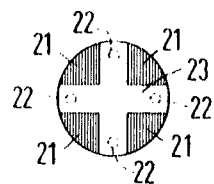

As shown in FIG. 2, a layer 23 of semiconductor material such as, for example, indium arsenide, is vapor-deposited on the end surface 21 of the rod 11. Other suitable semiconductor materials, which have a temperature coefficient of the Hall voltage and the electrical specific resistance which is less than or equal to 0.1 percent per degree Centigrade, are indium antimonide and germanium. The layer 23 of semiconductor material covers the wire ends of the wires 12 and has a thickness of 0.5 to 3.0 micrometers. The layer of semiconductor material 23 is vapor-deposited at a pressure of approximately $10^{-5}$ Torr at an end surface temperature in a range between 600° and 700° C.

The vapor-deposited layer of semiconductor material 23, as shown in FIG. 2, is of specific configuration, and covers the wire ends 22 of the wires 12. The specific configuration of the semiconductor material 23 is provided by a subsequent etching process and is a configuration which is usual for Hall probes, as shown in FIG. 2. In FIG. 2, the end surface 21 of the rod 11 is that of hardened glass, since the etching process has removed the semiconductor material 23 therefrom.

Hardened glass is preferably utilized as the rod 11, molybdenum is preferably utilized as the wires 12 and indium arsenide is preferably utilized as the semiconductor material 23. This is due to the fact that these three materials have almost the same expansion coefficient within a wide temperature range, so that there is excellent adhesion between the semiconductor layer and the molybdenum and glass. This provides excellent stability for the electrical properties of the Hall probe during abrupt, sharp or extreme temperature variations.

In the Hall probe of the present invention, the vapor-depositing process simultaneously includes all the contacting processes utilized in the production of a Hall device or generator. This is due to the fact that a corresponding end of each of the molybdenum wires 12 is in close electrical contact with the layer of semiconductor material 23 and the other ends of said wires protrude at the other end of the glass rod 11. The Hall probe thus provides the necessary terminal wires.

The Hall probe of the present invention may be provided, without difficulty, with diameters equal to or less than 1.0 mm. The utilization of glass as the rod 11 and the utilization of molybdenum as the wires 12, provides stability up to temperatures of 700° C and permits the vapor-deposition of very sensitive indium arsenide layers. The sensitivity of the Hall probes may thus be $$Ko \geq 0.2 \frac{V}{(A)kG}$$

wherein $Ko$ is the sensitivity of the Hall probes, $V$ is volts, $A$ is amperes and $kG$ is kilogauss.

While the invention has been described by means of a specific example and in a specific embodiment, we do not wish to be limited thereto, for obvious modifications will occur to those skilled in the art without departing from the spirit and scope of the invention.

We claim:

1. A Hall probe for measuring an axial magnetic field in a bore, comprising
   a rod of electrically insulating material resistant to temperature changes, said rod having an axial end surface;
   four wires embedded in said rod each having an exposed end at the end surface of said rod, the wire ends and said end surface being coplanar; and a layer of semiconductor material on the end surface of said rod covering said wire ends and in electrical contact therewith, said semiconductor material having a temperature coefficient of the Hall voltage and the electrical specific resistance which is less than or equal to 0.1 percent per degree Centigrade.

2. A Hall probe as claimed in claim 1, wherein said rod comprises hardened glass.

3. A Hall probe as claimed in claim 1, wherein each of the wires comprises molybdenum.

4. A Hall probe as claimed in claim 1, wherein each of the wires has a diameter in the range of 0.05 to 1.0 mm.

5. A Hall probe as claimed in claim 1, wherein said wire ends are at the points of a square on the end surface of said rod.

6. A Hall probe as claimed in claim 1, wherein said layer of semiconductor material has a thickness of 0.5 to 3.0 micrometers.

7. A Hall probe as claimed in claim 1, wherein said layer of semiconductor material comprises indium arsenide.

8. A Hall probe as claimed in claim 1, wherein said rod comprises hardened glass, each of said wires comprises molybdenum and has a diameter of 0.05 to 1.0 mm and said semiconductor material comprises indium arsenide having a thickness of 0.5 to 3.0 micrometers.

* * * * *

F-4174

PO-1050
(5/69)

UNITED STATES PATENT OFFICE
CERTIFICATE OF CORRECTION

Patent No. 3,665,366      Dated May 23, 1972

Inventor(s) HELMUT FRELLER et al

It is certified that error appears in the above-identified patent and that said Letters Patent are hereby corrected as shown below:

In the heading to the printed specification, the name and address of the assignee should read --Siemens Aktiengesellschaft,
    Berlin und München, Germany--

Signed and sealed this 10th day of April 1973.

(SEAL)
Attest:

EDWARD M. FLETCHER, JR.            ROBERT GOTTSCHALK
Attesting Officer                    Commissioner of Patents